March 5, 1968 — E. S. BABSON — 3,371,621
RACK TRANSFER DEVICES
Filed June 8, 1966 — 4 Sheets-Sheet 1

Inventor
Edward S. Babson
By his Attorney
Richard A. Wise

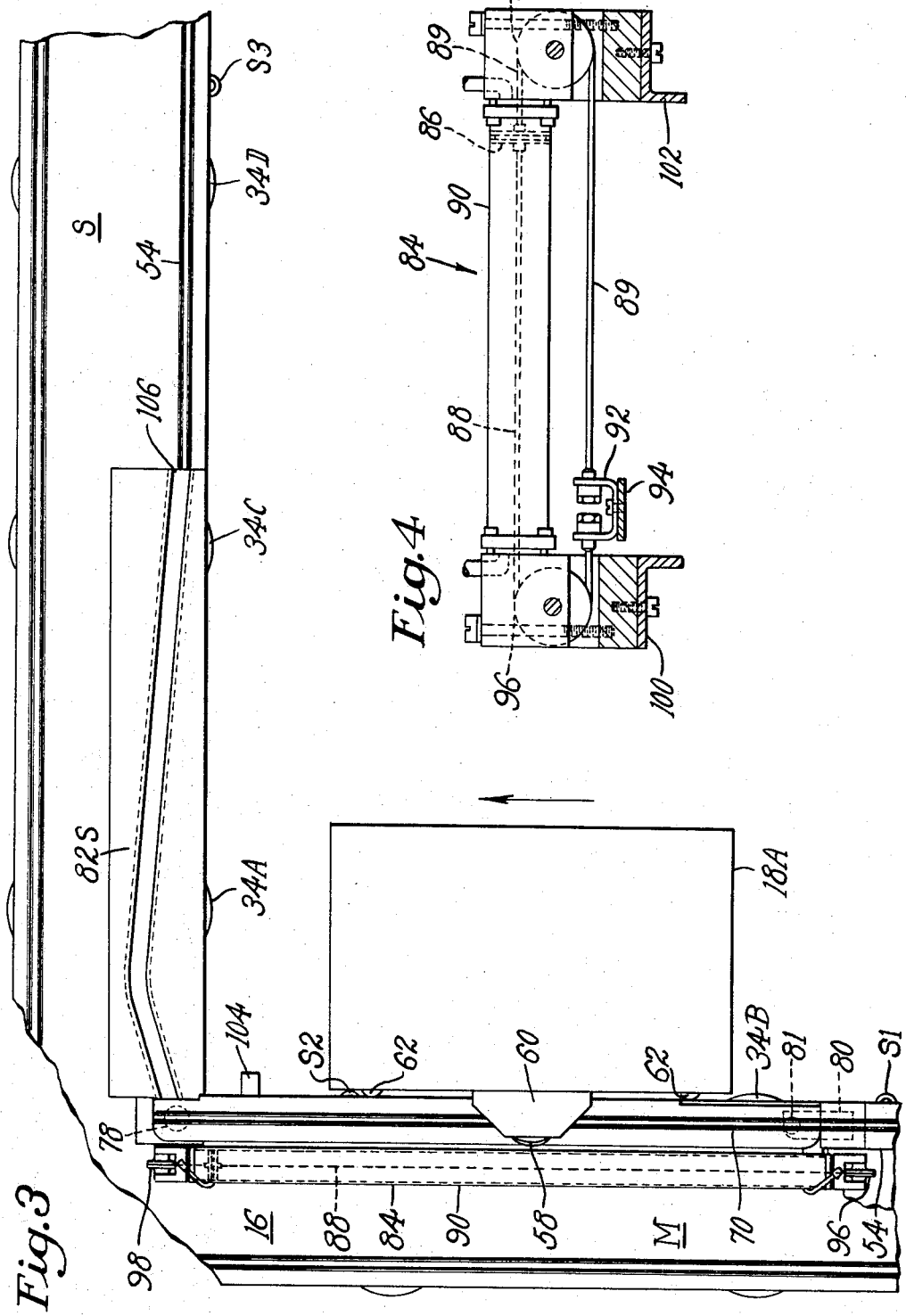

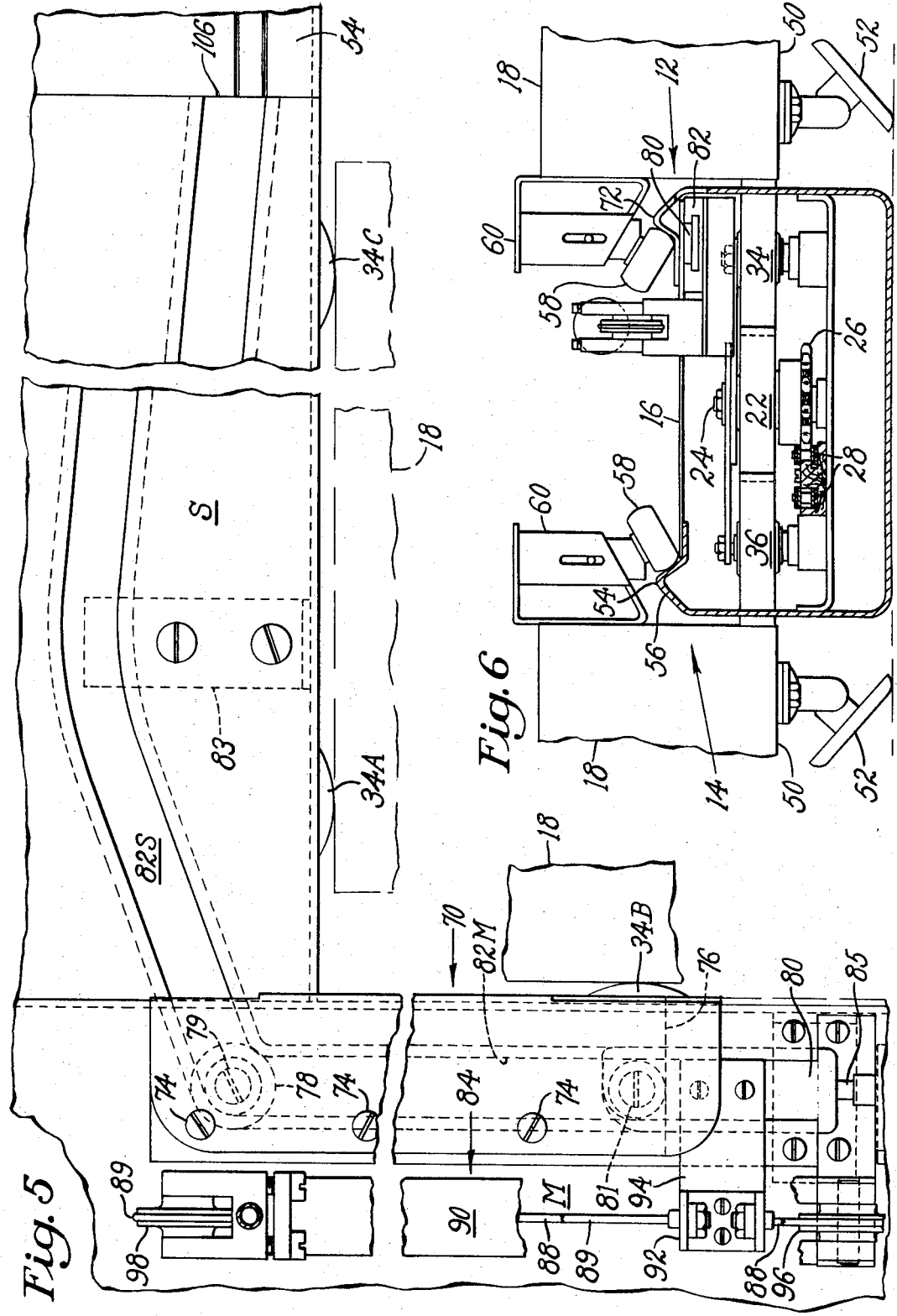

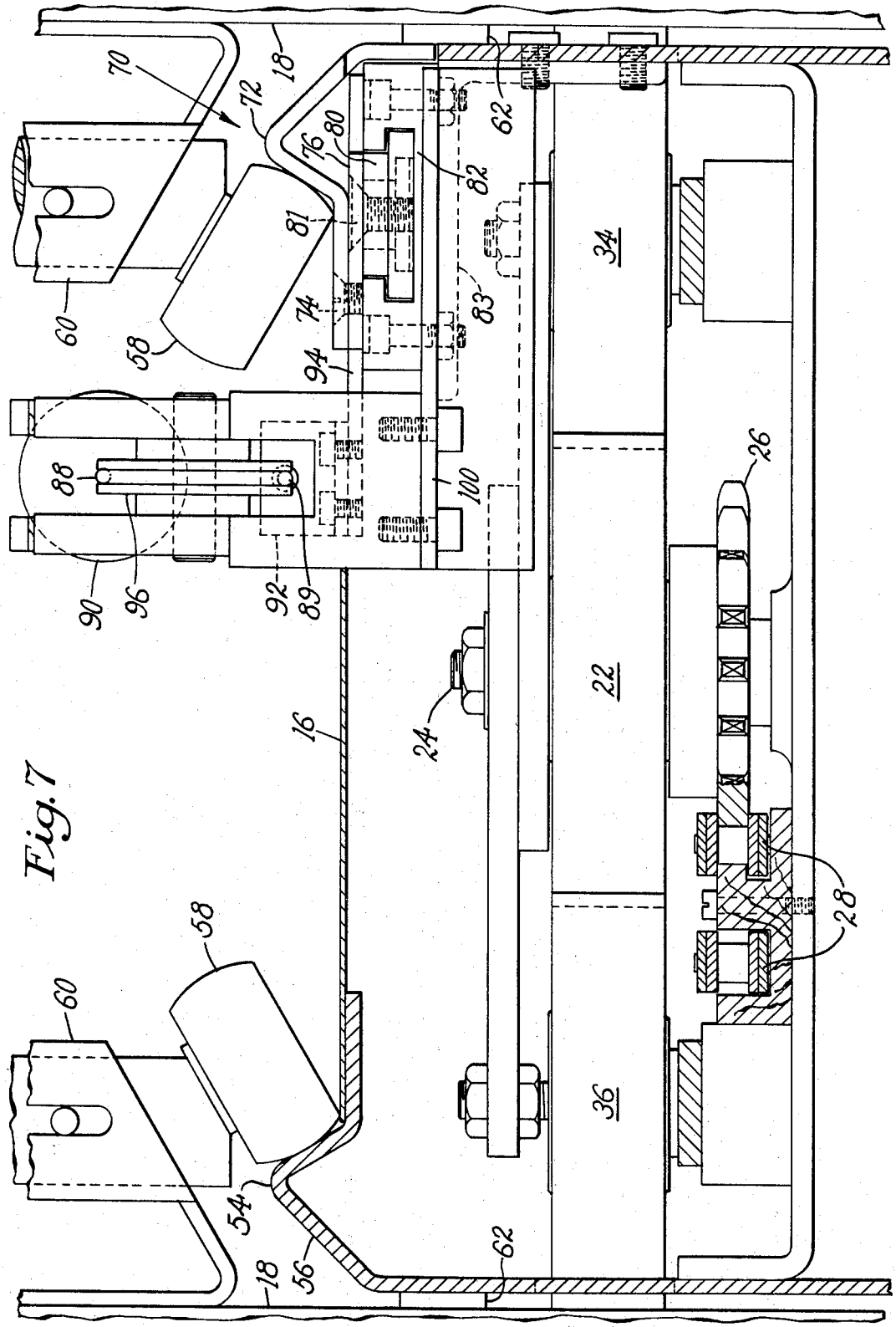

United States Patent Office 3,371,621
Patented Mar. 5, 1968

3,371,621
RACK TRANSFER DEVICES
Edward S. Babson, Ipswich, Mass., assignor to United Shoe Machinery Corporation, Boston, Mass., a corporation of New Jersey
Filed June 8, 1966, Ser. No. 556,125
6 Claims. (Cl. 104—172)

This invention relates generally to conveyor systems and more particularly to a transfer mechanism for moving article carrying units of a conveyor from the main line of the system to a spur line by turning an inside corner.

United States patent application Ser. No. 462,604, filed June 9, 1965, in my name discloses a track type conveyor system having two parallel runs along which move article carrying units illustrated as shoe racks. Mechanism is employed at the end of each run to turn the racks around an outside corner and return them in the opposite direction along the other run, the runs being located on opposite sides of a stationary elongated housing. The conveyor system includes control mechanism to stop the racks at predetermined work stations along the runs for removal by an operator.

At times, factory space limitations make it disadvantageous to use a conveyor system comprising only long straight runs. To overcome this problem it is obvious to provide a more compact conveyor including spur tracks or lines branching from a main line. It is contemplated that the invention hereinafter to be described will be employed in a conveyor system comprising at least one main line and one or more spur lines together defining an L or T shape configuration or combinations of both.

My earlier conveyor, which has been found to be both economical and practical, moves shoe racks along conveyor tracks by a series of driving wheels mounted in and projecting from the housing. The racks are supported on the tracks by spring biased means which engage a support shoulder or channel comprising a portion of the track, with the lower sides of the racks frictionally engaging the projecting driving wheels which are the rack's sole source of movement. Because a rack, in going around an inside corner, as for example, a right angle between a main line and a spur, becomes the hypotenuse of the angle, it would normally lose contact with the projecting drive wheels and stop. Hence, auxiliary transfer means must be provided for the racks to be able effectively to turn an inside corner.

It is a general object of this invention to provide a practical, economical conveyor system for article carrying units, the system having at least one main track and one or more spur tracks forming an L or T shape configuration with the main track.

It is a more specific object of this invention to provide in a conveyor system, transfer mechanism capable of moving an article carrying unit by way of an inside corner from a main track to and from a spur track.

Another object of this invention is to provide in a conveyor system having at least two stationary track portions forming an inside corner, a transfer device to move article carrying units in continuous uninterrupted motion from one stationary track portion to the other.

In accordance with these objects and as a feature of this invention there is provided in a conveyor system for article carrying units, a track layout including at least two stationary track portions, such as a main line and a spur, arranged in a configuration including an inside corner. The stationary track portions each include spaced driving wheels for propelling the units and an elongated support shoulder for maintaining the units in engagement with the driving wheels. A transfer mechanism is located at the inside corner with a movable support shoulder of a configuration similar to that of the stationary shoulders. The shoulder is mounted to move in a predetermined path defined by a guideway from a receiving position in alignment with the first stationary track portion to a delivery position in alignment with the second stationary track portion. Power means, operated in response to movement of units along the conveyor system, is employed to move the transfer mechanism to and from the delivery and receiving positions.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings,

FIG. 3 is a plan view on enlarged scale of the transfer mechanism employed in the FIG. 1 track layout;

FIG. 4 is a right side elevation, partially broken away, of an air motor for operating the transfer mechanism;

FIG. 5 is a partially broken plan view on enlarged scale of the transfer device shown in FIG. 1;

FIG. 6 is a partial sectional view of a track portion of the conveyor system looking toward a transfer mechanism; and FIG. 7 is a view similar to FIG. 6 on a larger scale showing more details of the transfer mechanism.

Figure 1:
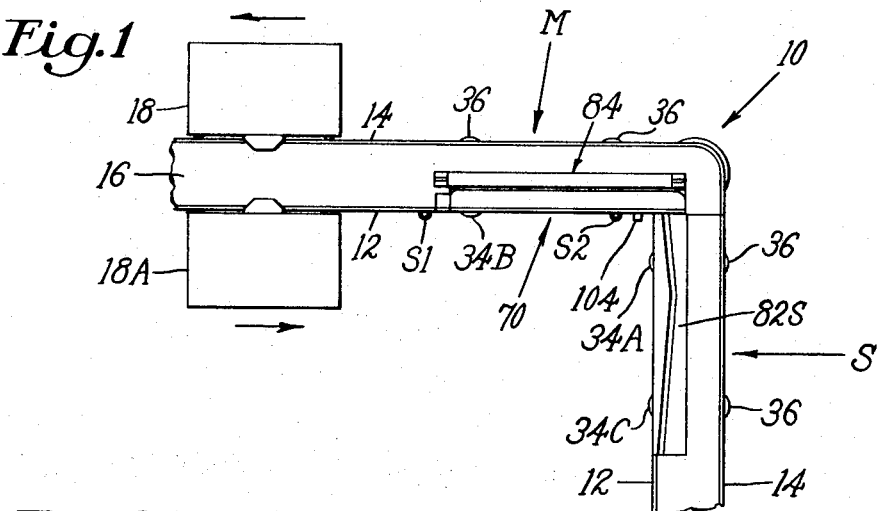
FIG. 1 is a schematic plan view of a conveyor system having an L shaped track layout embodying a transfer mechanism illustrating this invention.

A conveyor system of the type in which this invention may be employed will now be described broadly with reference to FIGS. 1, 2 and 6. Such a conveyor system is disclosed in my above-identified copending application to which reference may be had for a more detailed description.

The conveyor 10 includes a main line M and one or more spur lines S. Each of the main and the spur lines comprise a pair of conveyor runs 12 and 14 located on opposite sides of an elongated housing 16. The runs are constructed to convey article carrying devices, such as shoe carrying racks 18, between work stations (not illustrated) so that operators at the stations can remove the racks from the conveyor for performing operations on the shoes.

The driving means for the racks 18 comprises a plurality of driving wheels 22 (FIG. 6) centrally disposed lengthwise within the housing 16. Each wheel 22 is mounted on a vertical shaft 24 which also carries a sprocket 26. A traveling drive chain 28 which extends the length of the housing 16 engages each of the sprockets 26 to rotate the wheels 22.

Operatively connected to each drive wheel 22 are rack driving wheels 34 and 36 associated with the runs 12 and 14, respectively. The rack driving wheels 34 and 36 extend outwardly through apertures in the sides of the housing 16 to engage the lower side portion of each rack 18 to propel it along the runs.

Each rack comprises a base 50 supported by castors 52 angularly mounted to enable the rack to be moved freely in any direction. The racks mount suitable means (not shown), for carrying the shoes on which operations are to be performed at the work stations.

Each of the runs 12 and 14 has a track including a stationary guide ridge or shoulder 54 extending lengthwise of the run. The shoulder has a cam surface 56. The racks 18 are each provided with a spring-loaded roller detent 58 supported by a bracket 60. The roller detent 58 is positioned at a predetermined height on the rack so that when the rack is pushed sideways toward the housing 16 the roller detent 58 moves up the cam surfaces 56 snaps over the shoulder 54 into operative gripping relationship with the track, as shown in FIG. 6. The racks also include rollers 62 (FIG. 3) engageable with the upper side portions of the housing 16 just beneath the shoulder 56. When so engaged with the track, the lower sides of the racks 18 bear against the driving wheels 34 or 36 to receive driving power.

As also explained in my copending application, the rack driving wheels 34 and 36 are alternately extended and withdrawn from engagement with the racks upon actuation of switches strategically placed along the conveyor runs in position to be engaged by the moving racks in order to stop the racks at work stations and prevent piling up at outside corners, etc.

Figure 2:
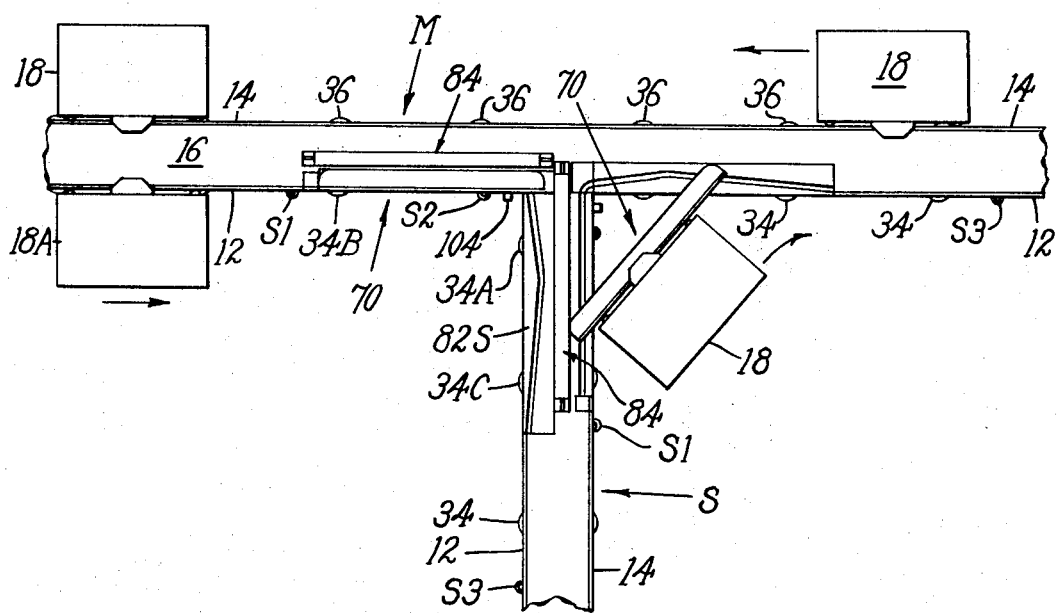
FIG. 2 is a schematic plan view similar to FIG. 1 of a T shaped track layout wherein a double L or two transfer mechanisms are employed adjacent each other.

FIGS. 1 and 2, illustrate in schematic fashion conveyor systems having main lines M and spur lines S in L and T configurations, respectively. As a rack 18A moves from left to right along the run 12 of the main line toward the spur, were there no provision for a transfer mechanism, the front end of the rack would ultimately engage the first driving wheel 34A on the spur. This engagement would tend to pivot the rack in a clockwise direction as viewed in FIGS. 1 and 2 whereby the rack effectively would become the hypotenuse of the angle of the corner between the main line M and the spur line S. Consequently, not only would the rack ultimately lose contact with the driving wheels 34 but the roller detent 58 would be pulled off the shoulder 54 causing the rack to stop moving. Hence, the need for the inside corner transfer mechanism now to be described.

The transfer mechanism, seen best in FIGS. 5 and 7, is generally indicated 70 and is of a size sufficient to accommodate one rack at a time. It has a movable track comprising a guide ridge or shoulder 72 which in cross section is substantially the same as the shoulders 54 on the stationary track portions of the conveyor. The shoulder 72 is secured by screws 74 to the top of an elongated plate 76. The plate 76, in turn pivotally mounts near one end a roller 78, secured by a screw 79 to the lower surface of the plate. At its opposite end the plate 76 also mounts beneath it a slide 80 pivotally attached to the plate by a screw 81. The roller 78 and slide 80 are of inverted T-shaped cross section and are received in a guideway 82 supported on a frame member 83 (FIG. 7) of the housing 16. The guideway has an inverted T-shaped cross section complementary to that of the slide and roller. The lower or rear end of the slide 80 is engageable for purposes hereinafter to be described with an air switch 85 (FIG. 5) fixed to a portion of the frame of the housing 16. The guideway 82 extends in continuous fashion along the main line M to the intersection of the spur line S, then for a distance along the spur, the portions being designated 82M and 82S, respectively.

The roller 78 is movable in the guideway portion designated 82S (FIG. 5) as the slide 80 is moved lengthwise of guideway portion 82M. This movement pivots the plate 76, and hence the shoulder 72, from the original or rack receiving position shown in FIGS. 1, 3 and 5, wherein it constitutes a linear continuation of the stationary track shoulder 54, to a second or discharge position on the spur S where it then constitutes a linear continuation of the stationary track shoulder 54 on that portion of the conveyor.

Motion is imparted to the transfer mechanism by any convenient reciprocable motor which is here illustrated as a conventional double acting "cable cylinder" 84 shown in side elevation in FIG. 4. The cable cylinder, being a readily available commercial item, will be described only generally. A piston 86, having the ends of cables 88, 89 attached to opposite faces is caused by air pressure to reciprocate within a cylinder 90. The cables 88, 89 pass around pulleys 96, 98 and are attached under tension to a generally U-shaped bracket 92 thereby forming a closed loop with the piston 86. The bracket 92 is attached directly to the slide 80 by a plate 94, and the cable cylinder is attached to the housing 16 by appropriate brackets 100, 102.

Selective air pressurization and depressurization within the cylinder 90 upon the opposed faces of the piston 86 causes the cables 88, 89 to pull the slide 80 back and forth in the guideway portion 82M and hence move the transfer mechanism 70 to and from the spur line S and the main line M.

The operation of the transfer mechanism 70 will now be described with particular reference to FIG. 3 which shows in plan view the transfer mechanism and portions of the conveyor system having an L shaped layout. As a rack 18A moves along the main line M in the direction of the arrow in FIG. 3, i.e. toward the spur line S, its forward end engages a switch $S_1$ which, in the manner described in my above-identified copending application retracts the next adjacent upstream rack driving wheel 34 (not shown), preventing further racks from approaching the transfer mechanism 70 until the trailing end of the rack passes the switch. As the rack moves toward a stop 104 on the housing 16 which prevents the rack from engaging the driving wheel 34A, its roller detent 58 passes from the stationary track portion, i.e. the shoulder 54, onto the movable track portion, i.e. the shoulder 72 of the transfer mechanism. The forward end of the rack then depresses a switch $S_2$ which initiates movement of the cable cylinder 84 to cause the slide 80 to move along the guideway portion 82M toward the spur S. The roller 78 simultaneously moves toward the right in the guideway portions 82S. Disengagement of the slide 80 from the switch 85 causes the drive wheel 34B to be retracted into nondriving position.

The transfer mechanism 70 including the movable shoulder 72 consequently pivots in a clockwise direction about the screw pivot 81 in the slide 80 pushing the rack 18A also in a generally clockwise direction outwardly from the housing 16. After the transfer mechanism 70 bridges the corner as shown at the right-hand side of FIG. 2, the rack 18 drawn in a continuous motion by the transfer mechanism inwardly toward the spur S as the roller 78 approaches the extreme right-hand end 106 of the guideway portion 82S. Upon completion of this movement the shoulder 72 is aligned with the stationary shoulder 54 on the spur S and the rack 18A is drawn inwardly against the continuously rotating rack driving wheels 34A and 34C located on the spur S. The rack is then moved freely by drive wheels along the spur S to the right as viewed in FIG. 3.

The rack then traveling along the spur S actuates a switch $S_3$ which causes the cable cylinder 84 to reverse the direction of the transfer mechanism 70 returning it to its starting position. The slide 80 re-engages the switch 85 to return the drive wheel 34B to its extended or rack engaging position and the mechanism is then ready to receive and transfer the next rack in line.

It will be obvious that numerous track layouts may be used with transfer mechanism used singly, in pairs or in any combination dictated by space requirement.

Having thus described my invention, what I claim as new and desire to secure by Letters Patent of the United States is:

1. In a system for conveying article carrying units, at least two stationary track portions arranged in a configuration including an inside corner, driving wheels along each stationary track portion for propelling the units, an elongated stationary shoulder on each of said track portions for maintaining the units in engagement with the driving wheels, a transfer mechanism for moving the units past the inside corner from one stationary track portion to the other comprising a movable shoulder, and means first to locate said movable shoulder in a position in alignment with one of said stationary shoulders to receive an article carrying unit and then while the unit is in engagement with the transfer mechanism to locate the movable shoulder in a delivery position in alignment with the second stationary shoulder.

2. A conveyor system in accordance with claim 1 in which means are provided to prevent additional units from entering the transfer mechanism when said mechanism is occupied.

3. A conveyor system in accordance with claim 1 in which the transfer mechanism is movable in a predetermined path defined by a fixed guideway associated with both stationary track portions.

4. A conveyor system in accordance with claim 1 in which the movable shoulder is pivotally secured to a slide which is movable in a fixed guideway.

5. A conveyor system in accordance with claim 1 in which at least one drive wheel of the second stationary track portion is located in a position to engage and propel the unit carried by the transfer mechanism when said movable shoulder is aligned with said second stationary shoulder.

6. A conveyor system in accordance with claim 1 having reversible motor means for reciprocating the transfer member to and from said delivery and receiving positions, and switch means on the stationary track portions engageable with the units for actuating said motor means.

No references cited.

JOSEPH R. LECLAIR, *Primary Examiner.*

ARTHUR L. LA POINT, *Examiner.*

D. F. WORTH, *Assistant Examiner.*